Aug. 20, 1968   H. L. DOBRIKIN   3,397,925

TRACTOR PROTECTION VALVE ASSEMBLY

Filed June 24, 1966

INVENTOR.
Harold L. Dobrikin,
BY Parker & Carter
Attorneys.

3,397,925
TRACTOR PROTECTION VALVE ASSEMBLY
Harold L. Dobrikin, Highland Park, Ill., assignor to Berg Mfg. & Sales Co., Des Plaines, Ill., a corporation of Illinois
Filed June 24, 1966, Ser. No. 560,188
1 Claim. (Cl. 303—29)

This invention relates to vehicle air brake systems and has particular relation to means for protecting the tractor air brake system in a tractor-trailer vehicle.

One purpose of the invention is to provide a single valve means effective to protect a tractor brake system in the event of failure affecting either the emergency or the service lines of the air brake system.

Another purpose is to provide a tractor system protection valve of maximum simplicity, construction and operation and minimum cost and manufacture.

Other purposes will appear from time to time during the course of the specification and claim.

Figure 1:
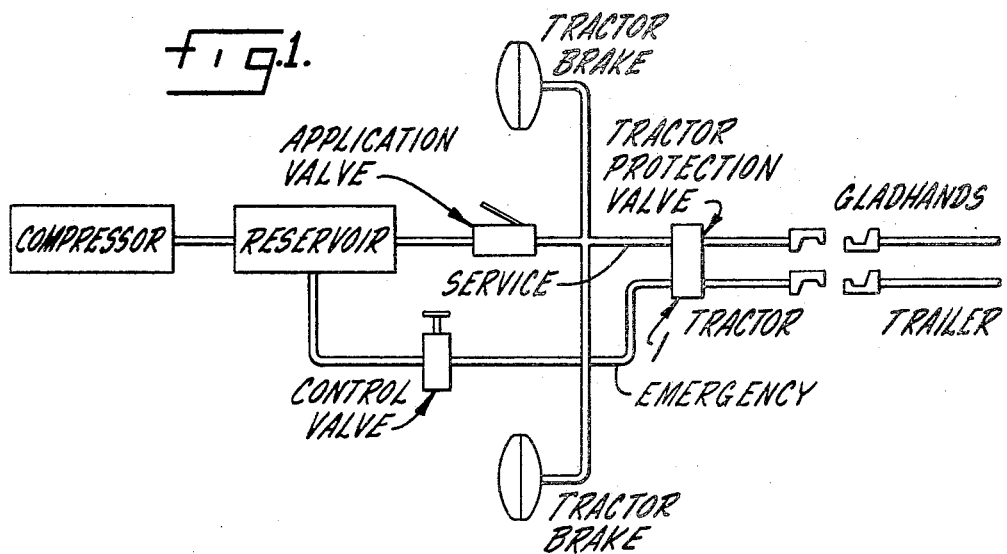
Figure 2:
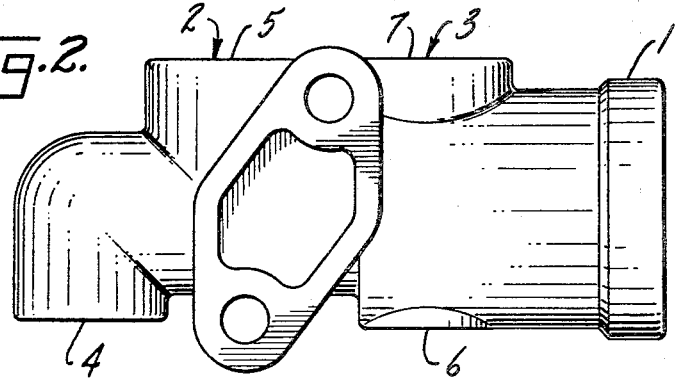
Figure 3:
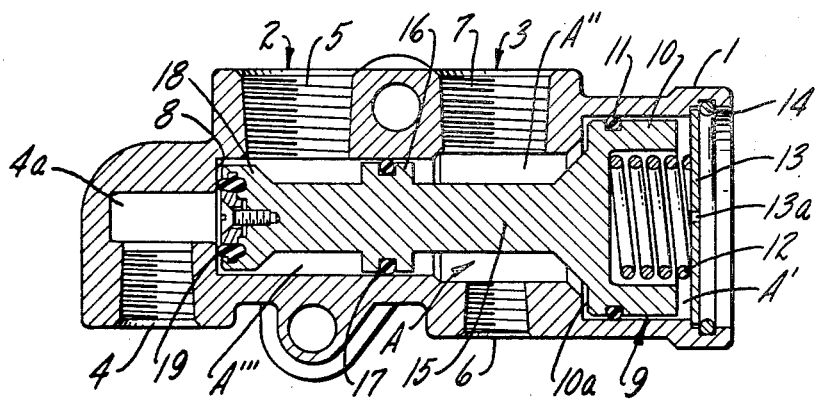

The invention is illustrated more or less diagrammatically in the accompanying drawings, wherein:

FIGURE 1 is a schematic system illustration;
FIGURE 2 is a side elevation of the valve of the invention; and
FIGURE 3 is a view in cross section.

Like parts are indicated by like numerals throughout the specification and drawings.

Referring now to the drawings, the valve of the invention includes a housing 1. The housing 1 has extending laterally therethrough a service passage 2 and an emergency passage 3. The passage 2 includes an inlet end 4 for attachment to a tractor service air pressure line and an outlet portion 5 for connection with a gladhand which is in turn connected with a trailer service line. Emergency passage 3 includes an inlet portion 6 for connection with a tractor emergency air pressure line and an outlet portion 7 for connection with a gladhand which is in turn arranged for connection with a trailer emergency air pressure line. The foregoing relationship of the valve of the invention to a vehicle air brake is illustrated in FIGURE 1.

A central chamber, indicated generally at A, is formed in housing 1. The service pressure inlet 4 and service outlet 5 communicate with one end portion of chamber A and a valve seat 8 is formed in housing 1 between inlet 4 and outlet 5. Valve seat 8 is conveniently formed by offsetting inlet 4 and providing the bend 4a to cause inlet passage 4 to communicate with chamber A through one end wall defining said chamber.

The chamber A includes an enlarged opposite end segment A'. A valve piston 9 is reciprocal in housing 1 and includes an enlarged end portion 10 mounted for movement in enlarged chamber portion A', the seal 11 being carried by piston portion 10 and engaging the internal surface defining chamber portion A'. A yielding means 12 engages the piston 9 within chamber portion A' and also engages a back plate 13 held in position within housing 1 by split-ring retainer member 14, the plate 13 being apertured as at 13a to preclude compression of air upon movement of piston 9 toward plate 13.

Piston 9 includes a reduced longitudinal shaft portion 15 which extends through the smaller chamber portions A" and A'" of chamber A of housing 1. Intermediate its ends the shaft extension 15 includes a circumferential enlargement 16 which in turn carries a seal 17 in engagement with the circumferential internal wall surface between chamber portions A" and A'". At its end opposite the piston enlargement 10 and beyond enlargement 16, the shaft portion 15 carries the enlargement 18 which in turn carries the valve 19 positioned for seating on valve seat 8 and urged thereagainst by spring 12. It will be observed that enlargement 10 of piston 9 is substantially greater in outer diameter than the enlargements 16 and 18.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The valve of FIGURES 2 and 3 is positioned in the vehicle air brake system as illustrated, for example, in the schematic showing of FIGURE 1. Thus the emergency conduit from the tractor reservoir is, with the emergency control valve open, in continuous communication through inlet 6, chamber portion A" and outlet 7. With the initial start-up of the system, therefore, emergency air pressure is delivered to the emergency trailer system. When sufficient pressure exists at inlet 6, and thus in chamber portion A", said pressure will act upon the large end surface 10a of piston enlargement 10 to move piston member 9 against the action of spring 12, thus unseating valve 19 from its seat 8 and opening communication between tractor service inlet 4 and trailer service outlet 5 through chamber portion A'". Thereafter, so long as the emergency pressure in the emergency line of the tractor-trailer vehicle system remains at or above such predetermined level the service line will remain open and actuation of application valve, shown in FIGURE 1, by the vehicle operator will provide braking action to the brakes of both tractor and trailer.

Upon failure or diminution of pressure below said predetermined amount in the emergency line, as a result of a leak, line breakage or inadvertent separation, for example, of the emergency gladhands, the pressure in chamber portion A" acting upon surface 10a would be correspondingly diminished and spring 12 would return the piston member 9 to the position shown in FIGURE 3, thus closing valve 19 upon its seat 8 and thereby closing communication between the tractor service system and the trailer service system and preserving the tractor service system against loss of pressure. Thus the operator has service pressure available to apply the brakes of the tractor.

Similarly, if a leak or breakage occur in the trailer service line or, for example, if the service gladhands should become inadvertently separated, the resulting loss of pressure would be transmitted to the tractor reservoir and thence to the emergency line, producing a reduction in pressure in chamber A" and a consequent seating of valve 19 as above-described. The control valve shown in FIGURE 1 will close at a predetermined pressure level to preclude loss of pressure in the reservoir below a pressure sufficient to provide application of the tractor brakes. The control valve may include means permitting manual operation as well as means producing automatic closing upon a drop in the pressure upstream of the control valve and thus in the reservoir below said predetermined level. A suitable valve, for example, is disclosed in U.S. Letters Patent 3,042,061, issued July 3, 1962, as well as in U.S. Letters Patent 3,027,905, issued Apr. 3, 1962.

Thus is provided a tractor protection valve effective automatically to protect and preserve the tractor service braking system against failure due to failures occurring at or beyond the gladhand connections with a trailer system. The valve is of maximum simplicity yet of minimum size and weight, employing a single moving part 9 as a piston responsive to emergency pressure as well as a valve effective to control service line communication between tractor and trailer and as a movable sealing element, as at 16, 17, dividing the single internal chamber in the valve housing into a chamber portion A" open to emergency line pressure at all times and a chamber portion A'" open to service line pressure when valve 19 is off its seat.

What is claimed:

1. A tractor protection valve assembly including a housing, an elongated chamber in said housing, said chamber having an enlarged end portion, a piston member having a piston portion reciprocal in said enlarged chamber portion, said piston member having a reduced, shaftlike extension extending through substantially the entire remainder of said chamber, said extension having a diameter less than that of said chamber remainder, an enlargement intermediate the ends of said extension, a seal carried by said enlargement and engaging an intermediate portion of the wall of said chamber remainder to divide the same into a first and a second chamber remainder portion, an emergency fluid pressure inlet communicating with said first remainder portion, an emergency fluid pressure outlet communicating with said first remainder portion and with said emergency fluid pressure inlet at all positions of said piston member, said piston portion being subject to emergency fluid pressure in said first remainder portion at all positions of said piston member, a valve member carried at the distal end of said extension beyond said intermediate extension enlargement, a service fluid pressure inlet formed in the end wall of said second remainder portion, said valve member being positioned to close said service fluid pressure inlet when said piston member is in one position, a service fluid pressure outlet communicating with said second remainder portion, yielding means engaging said piston portion and housing to urge said piston member toward said one position, said piston member being urged in the opposite direction by emergency fluid pressure above a predetermined amount in said first remainder portion to unseat said valve member and open communication between said service fluid pressure inlet and service fluid pressure outlet through said second remainder portion, said piston portion having a diameter substantially greater than those of said enlargement and said valve member.

References Cited

UNITED STATES PATENTS 3,104,133 9/1963 Valentine _____ 303—29 X
3,183,919 5/1965 Herring _____ 303—84 X DUANE A. REGER, *Primary Examiner.*